United States Patent
Töpker

(10) Patent No.: US 6,187,113 B1
(45) Date of Patent: Feb. 13, 2001

(54) STEEL ALLOY FOR MANUFACTURING BUMPERS FOR MOTOR VEHICLES

(75) Inventor: Dieter Töpker, Paderborn (DE)

(73) Assignee: Benteler AG, Paderborn (DE)

( * ) Notice: Under 35 U.S.C. 154(b), the term of this patent shall be extended for 0 days.

(21) Appl. No.: 09/413,153

(22) Filed: Oct. 6, 1999

(30) Foreign Application Priority Data

Oct. 13, 1998 (DE) .............................. 298 18 245

(51) Int. Cl.[7] ...................................... C22C 38/22
(52) U.S. Cl. ......................... 148/333; 148/334; 420/106
(58) Field of Search ................... 148/333, 334; 420/106

(56) References Cited

FOREIGN PATENT DOCUMENTS 55-107726 * 8/1980 (JP) .

09235617 * 9/1997 (JP) .

* cited by examiner

*Primary Examiner*—Sikyin Ip
(74) *Attorney, Agent, or Firm*—Friedrich Kueffner

(57) ABSTRACT

A steel alloy for pipes, sheet metal or sections for manufacturing bumpers for motor vehicles, wherein the steel alloy contains, in percent by weight, 0.17 to 0.20% carbon, 1.70 to 2.20% manganese, 0.45 to 0.75% chromium, 0.10 to 0.35% molybdenum, 0.03 to 0.05% aluminum, 0.01 to 0.05% titanium, 0.01 to 0.12% vanadium, 0.025 to 0.06% niobium, 0.0001 to 0.10% zirconium, 0.002 to 0.003% Boron, 0.01 to 0.04% nitrogen, up to 0.15% silicon and up to 0.025% phosphorus and up to 0.010% sulfur, wherein the remainder is iron including impurities caused from smelting, and wherein the sum of the alloy components titanium, vanadium and niobium is between 0.16 and 0.25%.

4 Claims, No Drawings

STEEL ALLOY FOR MANUFACTURING BUMPERS FOR MOTOR VEHICLES

BACKGROUND OF THE INVENTION

1. Field of the Invention

The present invention relates to a steel alloy for pipes, sheet metal or sections for manufacturing bumpers for motor vehicles.

2. Description of the Related Art

Bumpers are integrated at the front and the rear of a motor vehicle between the plastic shell which closes off the vehicle body and the frame of the motor vehicle. The purpose of the bumpers is to absorb light impacts and collisions without or with only little damage to the vehicle. The manner of operation of a bumper is to convert the kinetic energy resulting from an impact into work of deformation, so that no plastic deformations occur at the body structure, particularly at the side rails or side members of the body.

Consequently, a bumper must have sufficient strength as well as a high elasticity and bending stiffness in order to be able to absorb and conduct away the occurring forces and moments.

Since bumpers are manufactured in large quantities primarily from pipes, sheet metal or sections using the cold deformation method, it is additionally necessary to ensure an economical production where particularly the wear at the deformation tools must be kept low because any occurring wear has a disadvantageous effect on the production costs and causes stoppage and maintenance periods.

SUMMARY OF THE INVENTION

Therefore, it is the primary object of the present invention to provide a steel alloy for pipes, sheet metal or sections which are used for manufacturing bumpers for motor vehicles in an efficient and economical manner, wherein the steel alloy provides material properties which are suitable for this structural component, particularly a high elasticity and a good energy absorption capacity.

In accordance with the present invention, the steel alloy for pipes, sheet metal or sections for manufacturing bumpers of motor vehicles contains, in percent by weight, 0.17 to 0.20% carbon, 1.70 to 2.20% manganese, 0.45 to 0.75% chromium, 0.10 to 0.35% molybdenum, 0.03 to 0.05% aluminum, 0.01 to 0.05% titanium, 0.01 to 0.12% vanadium, 0.025 to 0.06% niobium, 0.0001 to 0.10% zirconium, 0.002 to 0.003% Boron, 0.01 to 0.04% nitrogen, up to 0.15% silicon and up to 0.025% phosphorus and up to 0.010% sulfur, wherein the remainder is iron including impurities caused from smelting, and wherein the sum of the alloy components titanium, vanadium and niobium is between 0.16 and 0.25%.

The various features of novelty which characterize the invention are pointed out with particularity in the claims annexed to and forming a part of the disclosure. For a better understanding of the invention, its operating advantages, specific objects attained by its use, reference should be had to the descriptive matter in which there are described preferred embodiments of the invention.

DETAILED DESCRIPTION OF THE INVENTION

A bumper manufactured from the steel alloy according to the present invention or the pipes, sheet metal or sections manufactured from the steel alloy have a load bearing capacity which meets the requirements to be made of a bumper. The bumper has the appropriate bending stiffness and an elastic damping capacity. Any impact forces introduced into the bumper are absorbed elastically and are compensated without causing a disadvantageous introduction of force into the frame of the motor vehicle.

The alloy components are specifically adapted to the manufacture of bumpers for motor vehicles and the requirements to be made in connection with bumpers. The carbon content together with the manganese provides a sufficient high strength while ensuring the desired high elasticity.

The zirconium content improves microhardening. Also contributing to microhardening is the ratio of titanium, vanadium and niobium intended according to the present invention, wherein the sum of these alloy components is to be between 0.16 and 0.25%. This has been found to be particularly advantageous in practical tests.

An essential alloying component is also the chromium in connection with molybdenum, aluminum and boron.

By adding molybdenum, the brittle fracture tendency at low temperatures is significantly reduced. The temperature drop (transition from ductile fracture to brittle fracture) is shifted in the notched bar impact bending diagram towards the left of the lower temperatures. This becomes of particular significance when low temperatures must be taken into consideration over relatively long periods of time.

Chromium contributes to the adjustment of the desired strength. Molybdenum increases the tensile strength, aluminum supports the fine grain formation, boron improves the hardening and increases the core strength. Chromium as well as aluminum additionally contribute to the corrosion resistance. Finally, nitrogen must be mentioned which provides surface hardening. Because of its affinity to titanium, vanadium, zirconium and aluminum, the structure becomes finer. This contributes to the high required ductility of the material.

Within the scope of the present invention it is important that the alloy composition and a specifically adjusted reeling temperature interact during the hot rolling process. Normally, the reeling temperature is between 650° C. and 600° C. In accordance with the present invention, the reeling temperature is now reduced to $\leq 550°$ C., wherein the desired structure bainite and martensite is adjusted. A structure of about 70% to 50% bainite and 40% to 20% martensite is obtained.

The invention is not limited by the embodiments described above which are presented as examples only but can be modified in various ways within the scope of protection defined by the appended patent claims.

I claim:

1. A steel alloy for pipes, sheet metal or sections for manufacturing bumpers for motor vehicles, the steel alloy comprising as alloy components in percent by weight

| | | |
|---|---|---|
| Carbon | (C) | 0.17 to 0.20% |
| Manganese | (Mn) | 1.70 to 2.20% |
| Chromium | (Cr) | 0.45 to 0.75% |

| | | |
|---|---|---|
| -continued | | |
| Molybdenum | (Mo) | 0.10 to 0.35% |
| Aluminum | (Al) | 0.03 to 0.05% |
| Titanium | (Ti) | 0.001 to 0.05% |
| Vanadium | (V) | 0.01 to 0.12% |
| Niobium | (Nb) | 0.025 to 0.06% |
| Zirconium | (Zr) | 0.0001 to 0.10% |
| Boron | (B) | 0.002 to 0.003% |
| Nitrogen | (N) | 0.01 to 0.04% |
| Silicon | (Si) | max. 0.15% |
| Phosphorus | (P) | max. 0.025% |
| Sulfur | (S) | max. 0.010%, | wherein a remainder is iron including impurities caused by smelting, and wherein a sum of the alloy components titanium, vanadium and niobium is between 0.16 and 0.25%.

2. A bumper for motor vehicles manufactured from pipes, sheet metal or sections manufactured from a steel alloy comprised in percent by weight of

| | | |
|---|---|---|
| Carbon | (C) | 0.17 to 0.20% |
| Manganese | (Mn) | 1.70 to 2.20% |

| | | |
|---|---|---|
| -continued | | |
| Chromium | (Cr) | 0.45 to 0.75% |
| Molybdenum | (Mo) | 0.10 to 0.35% |
| Aluminum | (Al) | 0.03 to 0.05% |
| Titanium | (Ti) | 0.001 to 0.05% |
| Vanadium | (V) | 0.01 to 0.12% |
| Niobium | (Nb) | 0.025 to 0.06% |
| Zirconium | (Zr) | 0.0001 to 0.10% |
| Boron | (B) | 0.002 to 0.003% |
| Nitrogen | (N) | 0.01 to 0.04% |
| Silicon | (Si) | max. 0.15% |
| Phosphorus | (P) | max. 0.025% |
| Sulfur | (S) | max. 0.010%, | wherein a remainder is iron including impurities caused by smelting, and wherein a sum of the alloy components titanium, vanadium and niobium is between 0.6 and 0.25%.

3. The steel alloy according to claim 1, having a structure of about 70% to 50% bainite and 40% to 20% martensite.

4. The bumper according to claim 2, wherein the steel alloy has a structure of about 70% to 50% bainite and 40% to 20% martensite.

\* \* \* \* \*